United States Patent
Delibie et al.

(10) Patent No.: US 11,115,377 B2
(45) Date of Patent: Sep. 7, 2021

(54) METHOD OF RESOLVING AN IP ADDRESS, CORRESPONDING SERVER AND COMPUTER PROGRAM

(71) Applicants: KERLINK, Thorigne-fouillard (FR); INSTITUT MINES-TELECOM, Paris (FR)

(72) Inventors: Yannick Delibie, Thorigne-Fouillard (FR); Laurent Toutain, Cesson Sevigne (FR); Alexander Pelov, Rennes (FR)

(73) Assignee: KERLINK, Paris (FR)

( * ) Notice: Subject to any disclaimer, the term of this patent is extended or adjusted under 35 U.S.C. 154(b) by 0 days.

(21) Appl. No.: 15/550,213

(22) PCT Filed: Feb. 12, 2016

(86) PCT No.: PCT/FR2016/050329
§ 371 (c)(1),
(2) Date: Aug. 10, 2017

(87) PCT Pub. No.: WO2016/128692
PCT Pub. Date: Aug. 18, 2016

(65) Prior Publication Data
US 2018/0026936 A1    Jan. 25, 2018

(30) Foreign Application Priority Data

Feb. 13, 2015  (FR) .................................. 1551243
May 12, 2015  (FR) .................................. 1554278

(51) Int. Cl.
*G06F 15/16* (2006.01)
*H04L 29/12* (2006.01)
*H04L 29/08* (2006.01)

(52) U.S. Cl.
CPC ...... *H04L 61/1511* (2013.01); *H04L 61/2007* (2013.01); *H04L 61/304* (2013.01); *H04L 61/6022* (2013.01); *H04L 67/12* (2013.01)

(58) Field of Classification Search
CPC ............. H04L 61/1511; H04L 61/2007; H04L 61/304; H04L 61/6022; H04L 67/12
USPC .......................................................... 709/245
See application file for complete search history.

(56) References Cited

U.S. PATENT DOCUMENTS

| | | | | |
|---|---|---|---|---|
| 9,160,609 | B2 * | 10/2015 | Dunbar | H04L 29/12028 |
| 9,210,079 | B2 * | 12/2015 | Sridhar | H04L 12/4633 |
| 9,258,209 | B2 * | 2/2016 | Janardhanan | H04L 45/04 |
| 9,473,383 | B1 * | 10/2016 | Venkatramani | H04L 45/72 |
| 9,473,495 | B2 * | 10/2016 | Kadur | H04L 63/0884 |
| 9,621,509 | B2 * | 4/2017 | Cj | H04L 61/6022 |

(Continued)

OTHER PUBLICATIONS

International Search Report for PCT/FR2016/050329 filed Feb. 12, 2016.

(Continued)

*Primary Examiner* — Melvin H Pollack
(74) *Attorney, Agent, or Firm* — Notaro, Michalos & Zaccaria P.C.

(57) ABSTRACT

A method for resolving an IP address, includes a step of receiving an address resolution request, the request including a datum representative of a MAC address; a step of looking up, within a data structure, an IP address, depending on the datum representative of a MAC address; and a step of transmitting said IP address.

8 Claims, 1 Drawing Sheet

(56) References Cited

U.S. PATENT DOCUMENTS

| | | | |
|---|---|---|---|
| 9,667,486 B2* | 5/2017 | Gokhale | H04L 61/2007 |
| 9,697,173 B2* | 7/2017 | Weaver | H04L 61/1511 |
| 9,730,269 B2* | 8/2017 | Iyer | H04L 12/4675 |
| 9,740,781 B2* | 8/2017 | Statia | H04L 29/12066 |
| 9,774,517 B2* | 9/2017 | Wittenstein | H04L 43/12 |
| 9,787,778 B2* | 10/2017 | Agarwal | H04L 67/16 |
| 9,788,185 B2* | 10/2017 | Seok | H04L 61/2007 |
| 9,794,219 B2* | 10/2017 | Gopinath | H04L 61/2076 |
| 9,825,906 B2* | 11/2017 | Wei | H04L 61/2596 |
| 9,935,791 B2* | 4/2018 | Sevilla | H04W 4/80 |
| 9,973,468 B2* | 5/2018 | Nath | H04L 61/2076 |
| 10,003,565 B2* | 6/2018 | George, IV | H04L 61/1511 |
| 10,171,286 B2* | 1/2019 | Seed | H04L 41/0273 |
| 10,205,698 B1* | 2/2019 | Petersen | H04L 61/103 |
| 10,243,918 B2* | 3/2019 | Zhang | H04L 61/1552 |
| 10,530,745 B2* | 1/2020 | Erb | H04L 61/1511 |
| 10,541,926 B2* | 1/2020 | Singh | H04L 61/2084 |
| 10,581,797 B2* | 3/2020 | Ripke | H04L 61/1511 |
| 10,904,144 B2* | 1/2021 | Morris | H04L 49/901 |
| 2005/0120119 A1* | 6/2005 | Bhanu | H04W 8/005 709/229 |
| 2009/0003214 A1* | 1/2009 | Vaswani | H04L 45/00 370/236 |
| 2011/0208863 A1* | 8/2011 | Le Ber | H04L 29/12066 709/225 |
| 2014/0289311 A1* | 9/2014 | Kubota | H04L 67/1036 709/203 |

OTHER PUBLICATIONS

Written Opinion for PCT/FR2016/050329 filed Feb. 12, 2016.
International Preliminary Report on Patentability or PCT/FR2016/050329 filed Feb. 12, 2016.
Finlayson et al: A Reverse Address Resolution Protocol; Stanford University, Jun. 1984 http://www.sanface.com/txt2pdf.html.

* cited by examiner

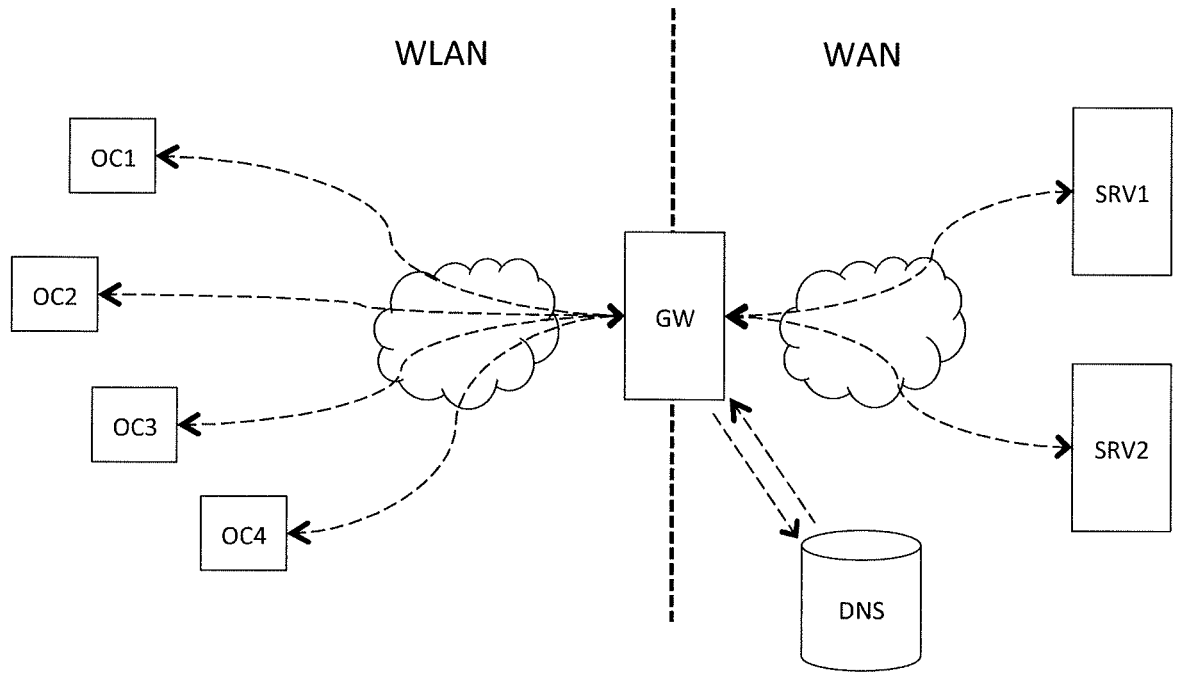
Fig. 1
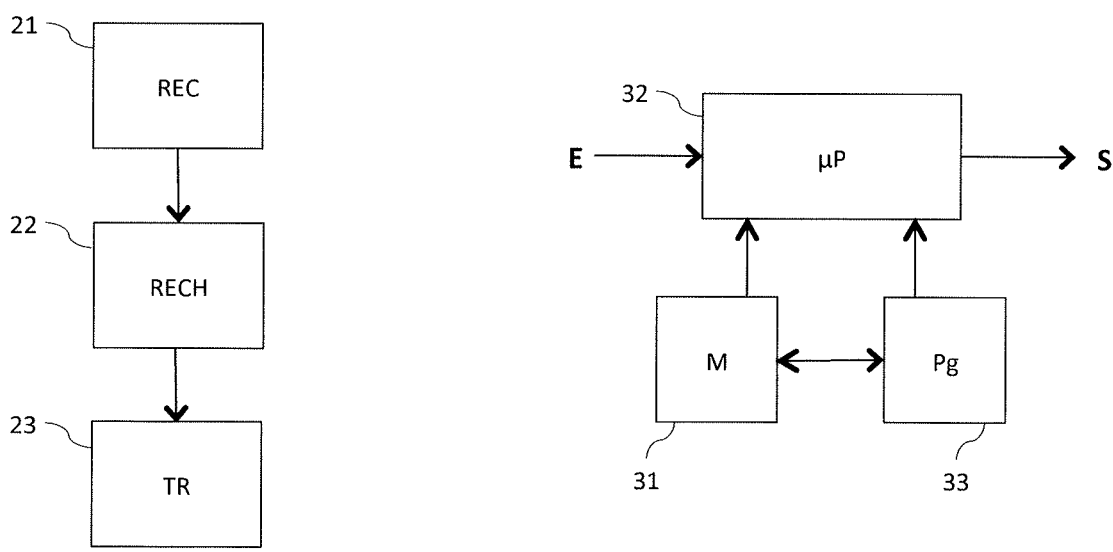
Fig. 2
Fig. 3

METHOD OF RESOLVING AN IP ADDRESS, CORRESPONDING SERVER AND COMPUTER PROGRAM

1. FIELD OF THE INVENTION

The field of the invention is that of the Internet of things. It relates more particularly to the interconnection of long-range wireless local area networks with the heart of a wide area network, such as the Internet, and in particular the case where these (local area and wide area) networks are based on heterogeneous communication protocols.

2. PRIOR ART

The Internet of things is on the rise. This trend is accompanied by the emergence of new applications, which go beyond the simple traditional domestic or business context, in order to be integrated within much larger infrastructures. The concept of 'smart cities' falls in particular within this context. Through the wide-scale deployment of networks of wireless sensors, or other communicating objects, it thus becomes possible to offer new services to citizens or to authorities responsible for managing a city. The range of possibilities is broad. Urban lighting may thus be optimized, by changing it dynamically depending on the state of the road traffic at a given instant, for example. Parking management may also be facilitated, by informing vehicle drivers in real time about the locations of available spaces, by virtue of sensors integrated into each of these spaces. This contributes for example to reducing the fuel consumption of the vehicles and therefore pollution.

Among the determining criteria for deploying such a network of wireless communicating objects, one such is essential: autonomy. By way of example, for obvious reasons of maintenance costs, the battery that supplies power to a sensor integrated into the carriageway for the purpose of detecting whether a parking space is free or occupied must be capable of providing electric power to this sensor for at least several years. Therefore, one of the features of these communicating objects is that they have low consumption. Again with the aim of best optimizing the electrical consumption of these communicating objects, the amount of information to be transmitted is also controlled, and the transmission rate is limited. The communication protocol used within such a local area network of communicating objects is therefore adapted accordingly, and these constraints mean that a network based on the IP ('Internet Protocol') protocol is not always suitable.

However, in order to broaden the possible applications and to make the collected information as widely available as possible, interconnection between the wireless local area network formed by these communicating objects and a wide area network such as the Internet is often desired. The problem then arises of achieving communication between devices (communicating objects, on the one hand, and servers, for example, on the other hand) that are present on communication networks that are based on heterogeneous communication protocols.

Some solutions exist, but these are generally limited. For example, while in the world of communication terminals connected to the Internet, a single access point is sufficient to achieve communication between a device and any other device also connected to the network, making available data sent by a network of sensors is currently based mainly on proprietary and integrated solutions that are complex to implement. Another limiting factor of these solutions is that they generally implement unilateral communication only: the communicating objects on the local area network send data that are effectively transmitted to servers on the wide area network, but the latter are not capable of transmitting data in return to communicating objects as they are not able to identify them.

3. SUMMARY OF THE INVENTION

The invention offers a solution that does not have at least some of these problems of the prior art, by virtue of an original method for resolving an IP address, characterized in that it comprises:
  a step of receiving an address resolution request, said request comprising a datum representative of a MAC address;
  a step of looking up, within a data structure, an IP address, depending on said datum representative of a MAC address;
  a step of transmitting said IP address.

According to one particular embodiment of the invention, said datum representative of a MAC address has the formalism of a domain name, said domain name being composed of at least two successive domains:
  a first lower-level domain, formed from said MAC address;
  at least one predetermined higher-level domain.

The method for resolving an IP address may thus be implemented within a conventional DNS ('Domain Name System') server, insofar as the datum representative of a MAC address has the same formalism as a domain name.

According to one particular embodiment of the invention, said MAC address identifies a communicating object, and said IP address identifies a device with which said communicating object has to exchange data.

The method for resolving a MAC address thus makes it possible to identify the remote servers with which communicating objects have to exchange data. The conventional use of a DNS server is thus cleverly altered so as to make it possible to identify a destination device with which a source device has to communicate.

According to one particular embodiment of the invention, the method for resolving an IP address furthermore comprises at least one step of looking up, within a data structure, at least one additional item of information depending on said datum representative of a MAC address, said at least one additional item of information being transmitted together with said IP address during said step of transmitting said IP address.

Alternatively, and according to another particular embodiment of the invention, the method for resolving an IP address furthermore comprises at least one iteration of the following steps:
  a step of receiving an additional request, said additional request comprising said datum representative of a MAC address and a datum representative of a type of request;
  a step of looking up, within a data structure, at least one additional item of information, depending on said datum representative of a MAC address and on said datum representative of a type of request;
  a step of transmitting said at least one additional item of information.

The method for resolving an IP address thus also makes it possible to obtain, in addition to the IP address of a destination server, additional information that is for example useful for implementing communication with this destination server, for example a port number to be contacted on this destination server, or indeed a communication protocol to be used for said communication. This method may still be implemented within a conventional DNS ('Domain Name System') server, when the datum representative of a MAC address has the same formalism as a domain name, the type of request then being used to specify the type of additional information to be obtained within the DNS tables. The recovery of the additional information may be implemented at the same time as the recovery of the IP address of the remote server, by means of one and the same request (for example by means of a DNS request of ANY type), or alternatively by means of a sequence of a plurality of requests of various types.

According to one particular embodiment of the invention, said at least one additional item of information belongs to the group comprising:
 a port number;
 a host name;
 a service type;
 a communication protocol.

In another aspect, the invention also relates to a server for resolving an IP address. Such a server comprises:
 means for receiving an address resolution request, said request comprising a datum representative of a MAC address;
 means for looking up, within a data structure, an IP address, depending on said datum representative of a MAC address;
 means for transmitting said IP address.

Accordingly, the invention also targets a program able to be executed by a computer or by a data processor, this program including instructions for controlling the execution of the steps of a method such as mentioned above.

This program may use any programming language and be in the form of source code, object code or intermediate code between source code and object code, such as in a partially compiled form or in any other desirable form.

The invention also targets an information carrier readable by a data processor, and including instructions of a program such as mentioned above.

The information carrier may be any entity or apparatus capable of storing the program. For example, the carrier may include a storage means, such as a ROM, for example a CD ROM or a microelectronic circuit ROM, or indeed a magnetic recording means, for example a floppy disk or a hard disk.

On the other hand, the information carrier may be a transmissible carrier such as an electrical or optical signal, which may be routed via an electrical or optical cable, by radio or by other means. The program according to the invention may in particular be downloaded from an Internet-type network.

Alternatively, the information carrier may be an integrated circuit into which the program is incorporated, the circuit being designed to execute, or to be used in the execution, of the method in question.

According to one embodiment, the invention is implemented by means of software components and/or hardware components.

A software component corresponds to one or more computer programs, one or more sub-programs of a program, or, more generally, to any element of a program or of an item of software able to implement a function or a set of functions. Such a software component is executed by a data processor of a physical entity (terminal, server, gateway, router, etc.) and is able to access the hardware resources of this physical entity (memories, recording carriers, communication buses, input/output electronic boards, user interfaces, etc.).

In the same way, a hardware component corresponds to any element of a hardware assembly able to implement a function or a set of functions. This may be a hardware component that is programmable or that has an integrated processor for executing software, for example an integrated circuit, a chip card, a memory card, an electronic board for executing an item of firmware, etc.

The various embodiments mentioned above are able to be combined with one another in order to implement the invention.

4. LIST OF FIGURES

Other features and advantages of the invention will emerge more clearly upon reading the following description of a preferred embodiment of the invention, given by way of simple illustrative and non-limiting example, and the appended drawings, in which:

FIG. 1 shows an overview of the general context of the invention, in one particular embodiment;

FIG. 2 illustrates the main steps implemented by the method for resolving an IP address, in one particular embodiment of the invention;

FIG. 3 describes a simplified architecture of a server able to implement the proposed method, in one particular embodiment of the invention.

5. DETAILED DESCRIPTION 5.1 General Context

The invention relates to a method for resolving an IP address in a context of a bidirectional communication session between a communicating object, on the one hand, and a device such as a remote server or a mobile communication terminal, on the other hand, the communicating object and the device each belonging to different networks based on heterogeneous communication protocols. This method is implemented within a gateway interconnecting these two networks, or within a resolution server that this gateway is able to interrogate. Throughout the remainder of the document, it is considered that said device is a remote server, but this example is given by way of illustrative and non-limiting example.

What is shown in relation to FIG. 1 is an overview of the general context of the invention, in one particular embodiment. A first wireless local area communication network (WLAN for 'Wireless Local Area Network') is interconnected with a wide area communication network (WAN for Wide Area Network)—typically the Internet—by means of a gateway (GW). Said gateway therefore comprises network interfaces enabling it to belong both to the local area network and to the wide area network.

Besides the gateway (GW), the wireless local area network comprises a set of communicating objects (OC) (FIG. 1 shows, by way of example, a local area network that contains four communicating objects OC1 to OC4, but this is purely illustrative: the number of communicating objects present in the local area network according to the proposed technique is arbitrary). These communicating objects may for example be wireless sensors. They have the feature of having low consumption and of using very low-rate communication means (<2 Kbps). These communicating objects are mostly battery-operated. In order to optimize their consumption, the periods of time during which they are able to send or receive data are limited. Outside of these sending and/or receiving periods, a communicating object is for example in a standby state, thereby enabling it to reduce its electrical consumption. In the context of the invention, the wireless local area communication network (WLAN) is not based on the IP communication protocol. It may be a Zigbee® network, or indeed a conventional Bluetooth® or Low-Energy (Bluetooth Smart®) network, or any other network not based on the IP communication protocol. The communication protocol used on this local area network is nevertheless addressed: each communicating object (OC) is thus able to be uniquely identified on this network, by means of a specific identifier, for example a MAC ('Media Access Control') address.

The wide area network (WAN), for its part, is based on the IP communication protocol. This typically involves the Internet. Each device connected to this network is therefore identified by an IP address. This network comprises in particular the gateway (GW), but also remote servers (SRV) configured to collect and process the information originating from all or some of the various communicating objects present on the wireless local area communication network (only two remote servers SRV1 and SRV2 are shown in FIG. 1, but it goes without saying that this is again a purely illustrative example). It may also comprise servers of the DNS ('Domain Name System') server type that are able to be interrogated in order to resolve addresses (a single one is shown, by way of example, in FIG. 1), for example for the purpose of obtaining the IP address associated with a given domain name.

In order to be able to establish communication between a communicating object and a remote server, the gateway (GW) performs the role of a routing platform, able to convey the data originating from a communicating object to the appropriate remote server, and vice versa.

Therefore, the gateway must have a mechanism making it possible to establish a bidirectional communication session between a communicating object, which initiates the communication, and the remote server with which it wishes to communicate, these devices belonging to networks using heterogeneous communication protocols. It is this mechanism, which guarantees the addressability and the translation of the addresses between these two networks (WLAN and WAN), that is the subject of the present invention, and more particularly the mechanism enabling the gateway to identify the destination server for data sent by a communicating object.

5.2 General Principle and Case of Use

In order to respond to this problem, what is proposed here, in relation to FIG. 2, is a method for resolving an IP address, characterized in that it comprises:
- a step (21) of receiving an address resolution request, said request comprising a datum representative of a MAC address;
- a step (22) of looking up, within a data structure, an IP address, depending on said datum representative of a MAC address;
- a step (23) of transmitting said IP address.

In the context of the invention, establishing a communication session between a communicating object and a remote server is always performed on the initiative of the communicating object. Moreover, the gateway has means enabling it to obtain, for example depending on the identifier representative of the communicating object in the local area network, an IP address of the remote server to which to transmit the data originating from the communicating object, and also a destination port to be used. These means, which are the subject of the present invention, are detailed later in the document. The gateway, which has its own IP address on the wide area network, is therefore able to transmit the useful load received from a communicating object to said remote server, in accordance with the standard communication protocols of an IP network, typically a protocol of the transport layer of the TCP/IP protocol stack, such as the UDP (for 'User Datagram Protocol') protocol or the TCP ('Transmission Control Protocol') protocol.

In the context of the invention, one and the same remote server is however able to receive information originating from a multitude of communicating objects. Therefore, one and the same IP address/port pair representative of a service of a remote destination server is generally associated with a multitude of communicating objects. From the point of view of the server, all of the information received on this port originates however from one and the same device: the gateway. In order to ensure the bidirectionality of the exchanges, the gateway must therefore be able to route the data received from a server to the correct communicating object, i.e. the one that initiated the communication session with this server. To this end, upon reception of a data frame originating from a communicating object, the gateway allocates a port number to this communicating object, which port number will be associated solely with the communicating object for the entire duration of a communication session with the remote server to which it has to transmit its data. This port number is used as source port, together with the IP address of the gateway on the wide area network, during the transmission, from the gateway to the remote server, of a useful load received by the gateway originating from a communicating object. In this way, when the gateway receives data originating from a remote server in return, it is able, on the basis of the port on which it receives these data, to determine the communicating object for which these data are intended.

What is of interest here is the mechanism enabling the gateway to determine the remote server to which a communicating object has to transmit data. To this end, the method for resolving an IP address, already described in relation to FIG. 2, is implemented. This method makes it possible, on the basis of an identifier of a communicating object in the wireless local area network (typically its MAC address), to identify the IP address (IPv4 or IPv6) and optionally the port of the remote server with which this communicating object has to exchange data.

In one particular embodiment of the invention, this method may be implemented actually within the gateway interconnecting the wireless local area network and the wide area network. The gateway then has a data structure within which are stored associations between identifiers (MAC addresses) of communicating objects and IP addresses and/or port numbers associated with remote servers. According to the protocol used on the wireless local area communication network, the search key for looking up the address may be based on different fields (for example the DevADDR field (including the NET ID) for the LoRaWAN protocol; the A-FIELD field for the protocol; the SRC PAN and/or SRC ADRR field for the IEEE802.15.4 protocol).

Alternatively, said method is implemented within a server external to the gateway, that the gateway is able to interrogate. The reception, at the gateway, of a datagram containing the MAC address (EUI-48/64) of a communicating object then triggers an address resolution request to this external server, in order to determine the remote destination server for the data sent by the communicating object. In another particular embodiment of the invention, this external server is a conventional DNS ('Domain Name System') server, which makes it possible to translate a domain name into an IP address. In this case, the address database (DNS) may for example rely on a DNS table of A or AAAA type (IPv6), which makes it possible to locate the server, an entry of which is similar to the following example (given purely by way of illustration):

0086544567768954.wellknown_domain IN A 91.198.174.232

For reasons of nomenclature compliance, the MAC address (EUI48/64) (in the example above '00:86:54:45:67:76:89:54') is then shown without the separating character ':'. The construction of a datum representative of a MAC address in the form of a domain name (by concatenating this MAC address with a predetermined higher-level domain name) then makes it possible to cleverly alter the functionality of a DNS server, and to use such a server to obtain an IP address of a server with which a communicating object has to communicate, depending on the MAC address of said communicating object.

The proposed technique also makes it possible, in another particular embodiment of the invention, to obtain additional information besides the IP address of the server with which the communicating object is intended to communicate. This additional information may consist, by way of illustration but non-limitingly, of a port number identifying the service to be contacted within the remote server, a host name characterizing this service, or indeed the communication protocol to be used in the context of communication with this service (for example HTTP on TCP, CoAP on UDP, etc.). In this context, the conventional functionalities of a DNS server are once again neatly altered, in order to obtain this additional information depending on a datum representative of a MAC address of the communicating object at the start of a communication. Specifically, a DNS server already incorporates mechanisms making it possible to obtain additional information relating to the various services available on a remote server, by virtue of a typing of the requests that are addressed thereto: in addition to A or AAAA-type requests that make it possible to obtain an IP address depending on a domain name, a DNS server specifically accepts other types of requests (for example PTR (pointer) or SRV (service) type requests) giving access to additional information. Thus, analogously to the technique already disclosed previously for recovering the IP address of the remote server with which a communicating object has to communicate, a DNS server may also be used to obtain additional information characterizing the service to which this communicating object has to be linked within this remote server (port number of the service to be contacted, communication protocol to be used, etc.). A datum representative of the MAC address of the communicating object is here again used as search key within the DNS tables, the type of request addressed to the DNS server then serving to indicate the type of additional information to be recovered. On the same principle as that described previously, this datum cleverly takes the form of a domain name (it is the same datum, for example, as that which served in recovering the IP address of the remote server with which the communicating object has to communicate, but used together with a different type of DNS request).

The technique proposed in the present patent application therefore readily makes it possible, depending on a MAC address of a communicating object, to identify a remote server with which this communicating object has to communicate, and to obtain all the information useful for implementing such communication.

The recovery, by interrogation of a DNS server, of the IP address of a remote server and of the associated additional information may be the subject of a sequence of a plurality of requests of various types addressed to this DNS server. Alternatively, all of these data (the IP address of the remote server and the associated additional information, such as a port number) may also be recovered by means of one and the same request (for example a DNS request of ANY type).

5.3 Apparatus for Implementing the Invention

There is described, in relation to FIG. 3, a resolution server comprising means enabling the resolution of an IP address according to the invention. Such a resolution server comprises:

means for receiving an address resolution request, said request comprising a datum representative of a MAC address;

means for looking up, within a data structure, an IP address, depending on said datum representative of a MAC address;

means for transmitting said IP address.

For example, the server comprises a memory 31 formed of a buffer memory, a processing unit 32, equipped for example with a microprocessor, and controlled by the computer program 33, implementing the method for resolving an IP address according to the invention.

On startup, the code instructions of the computer program 33 are for example loaded into a memory before being executed by the processor of the processing unit 32. The processing unit 32 receives at the input (E) for example an address resolution request originating from a device connected to the network, for example a gateway interconnecting a local area network and a wide area network. The microprocessor of the processing unit 32 performs the steps of the IP address resolution method, in accordance with the instructions of the computer program 33, in order to determine a destination IP address and transmit this IP address at the output (S).

To this end, the server comprises, besides the buffer memory 31, means for transmitting/receiving data that may be embodied in the form of an interface for connecting to one or more communication networks, these means possibly making it possible to establish a link to a wide area Internet-type network. It may involve software interfaces or hardware interfaces (of the network card or network communication hardware module type). According to the invention, such a server furthermore comprises storage means that may take the form of a database, or access to such storage means that are external to the server. These storage means comprise a data structure within which are recorded associations between data representative of MAC addresses and IP addresses.

The invention claimed is:

1. A method for resolving an IP address, characterized in that it comprises:

a step (21) of receiving, by a DNS server, an address resolution request, said request comprising a datum representative of a MAC address, in which said MAC address identifies a communicating object connected to a wireless local area network, said wireless local area network being based on an addressed communication protocol using said MAC address and different from IP, wherein said wireless local area network does not use the IP, said datum representative of a MAC address having the form of a domain name, said domain name being composed of at least two successive domains:

a first lower-level domain, formed from said MAC address;

at least one predetermined top-level domain;

a step (22) of looking up, within a database of addresses of the DNS server, an IP address, depending on said datum representative of a MAC address, in which said IP address identifies a device with which said communicating object has to exchange data;

a step (23) of transmitting said IP address, by the DNS server, to a gateway interconnecting the wireless local area network through a network interface employing said addressed communication protocol different from IP with an IP wide area network.

2. The method for resolving an IP address as claimed in claim 1, characterized in that it furthermore comprises at least one step of looking up, within a data structure of the DNS server, at least one additional item of information depending on said datum representative of a MAC address, said at least one additional item of information being transmitted, by the DNS server to the gateway, together with said IP address during said step of transmitting said IP address.

3. The method for resolving an IP address as claimed in claim 1, characterized in that it furthermore comprises at least one repetition of the following steps:

a step of receiving, by the DNS server, an additional request, said additional request comprising said datum representative of a MAC address and a datum representative of a type of request;

a step of looking up, within a data structure of the DNS server, at least one additional item of information, depending on said datum representative of a MAC address and on said datum representative of a type of request;

a step of transmitting, by the DNS server to the gateway, said at least one additional item of information.

4. The method for resolving an IP address as claimed in claim 2, characterized in that said at least one additional item of information belongs to the group comprising:

a port number;

a host name;

a service type;

a communication protocol.

5. A system for resolving an IP address, comprising:

a communicating object connected to a wireless local area network, wherein said communicating object is identified by a MAC address, said wireless local area network being based on an addressed communication protocol using the MAC address and different from IP; wherein said wireless local area network does not use the IP, a gateway, said gateway comprising a first network interface connected to the wireless local area network;

a second network interface connected to an IP wide area network a DNS server, said DNS server comprising means for receiving an address resolution request, said request comprising a datum representative of the MAC address, said datum representative of the MAC address having the form of a domain name, said domain name being composed of at least two successive domains:

a first lower-level domain, formed from said MAC address;

at least one predetermined top-level domain;

means for looking up, within a database of addresses of the DNS server, an IP address, depending on said datum representative of a MAC address, said IP address identifying a device with which said communicating object has to exchange data;

means for transmitting said IP address to said gateway interconnecting the wireless local area network with the IP wide area network.

6. A computer program product downloadable from a computer network, stored in a memory, and executed by a microprocessor, characterized in that it comprises program code instructions for the execution of the method for resolving an IP address as claimed in claim 1 when it is executed on a DNS server.

7. The method for resolving an IP address as claimed in claim 1, characterized in that said addressed communication protocol has lower consumption than IP.

8. The method for resolving an IP address as claimed in claim 2, characterized in that said addressed communication protocol is selected from the group consisting of BLUETOOTH, BLUETOOTH SMART and ZIGBEE.

\* \* \* \* \*